(12) United States Patent
Peng

(10) Patent No.: US 7,907,228 B2
(45) Date of Patent: Mar. 15, 2011

(54) TFT LCD STRUCTURE AND THE MANUFACTURING METHOD THEREOF

(75) Inventor: Zhilong Peng, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 263 days.

(21) Appl. No.: 12/126,303

(22) Filed: May 23, 2008

(65) Prior Publication Data
US 2009/0073336 A1    Mar. 19, 2009

(30) Foreign Application Priority Data

Sep. 13, 2007  (CN) .......................... 2007 1 0121731

(51) Int. Cl.
G02F 1/1333  (2006.01)
G02F 1/1339  (2006.01)
(52) U.S. Cl. .......................................... 349/49; 349/153
(58) Field of Classification Search .................... 349/40, 349/153
See application file for complete search history.

(56) References Cited

U.S. PATENT DOCUMENTS

| | | | |
|---|---|---|---|
| 6,392,735 B1 * | 5/2002 | Tani | 349/156 |
| 7,443,478 B2 * | 10/2008 | Hirakata et al. | 349/149 |
| 7,483,110 B2 * | 1/2009 | Yamaguchi et al. | 349/153 |
| 2006/0232740 A1 * | 10/2006 | Shigemura et al. | 349/153 |
| 2007/0177067 A1 * | 8/2007 | Kim et al. | 349/43 |

* cited by examiner

Primary Examiner — David Nelms
Assistant Examiner — David Y Chung
(74) Attorney, Agent, or Firm — Ladas & Parry, LLP

(57) ABSTRACT

Provided is a thin film transistor liquid crystal display (TFT LCD), comprising a color filter substrate and an array substrate disposed opposite to each other; wherein the array substrate comprises a base substrate, data lines and gate lines formed on the base substrate, and an insulating protective layers on the data lines or gate lines; the color filter substrate and the array substrate are assembled with each other in a peripheral portion with sealant mixed with metal micro-balls at a ratio, and a top conductive film is formed on the insulating protective layer above the data lines or gate lines below the sealant in the peripheral portion.

8 Claims, 3 Drawing Sheets

TFT LCD STRUCTURE AND THE MANUFACTURING METHOD THEREOF

BACKGROUND

The present invention relates to a thin film transistor liquid crystal display (TFT-LCD).

Electrostatic discharge (ESD) breakdown is a critical factor affecting the yield of TFT LCD products and may cause severe damage to the products. Although some means, such as use of ionic wind for eliminating electrostatic, have been adopted in manufacturing process, electrostatic breakdown phenomena still exists.

A TFT LCD comprises a color filter substrate and a TFT array substrate that are disposed opposite to each other. FIG. 1 is a sectional view illustrating the peripheral structure around a TFT LCD display region in a conventional technique. As shown in FIG. 1, the color filter substrate is configured on the TFT array substrate and comprises a base substrate 1 and a common electrode 2 formed on the base substrate 1. The TFT array substrate comprises a base substrate 3, a common electrode 8 on the base substrate 3, a bottom metal insulating layer 4 formed on a bottom metal layer (comprising the common electrode 8, gate lines, etc (not shown)), data lines 5 formed above the bottom metal insulating layer 4, an insulating protective layer 6 above the data line 5, a via hole 7 formed in the insulating layers (comprising the bottom metal insulating layer and insulating protective layer) above the common electrode 8, and a via hole conductive film 10 formed within the via hole 7. The color filter substrate and the array substrate are assembled using sealant 12 applied along the periphery of the display region, and the TFT array substrate is electrically connected with the color filter substrate through the common electrode 2, the via hole conductive film 10, and conductive adhesive 9 on the common electrode 8. In the peripheral structure around the TFT LCD display region, the contact resistance is large between the conductive adhesive 9 and the via hole conductive film 10 in the conductive path established with the common electrodes 2 and 8 through the conductive adhesive 9 therebetween. The via hole conductive film 10 may be a transparent conductive material, such as indium tin oxide (ITO).

FIG. 2 is a sectional view illustrating another peripheral structure around a TFT LCD display region in the conventional technique. As shown in FIG. 2, metal micro-balls 11 are used instead of the conductive adhesive to establish electrical connection between the color filter substrate and the TFT array substrate. Such a connection method using micro-balls is helpful to prevent non-uniform display (particularly to the large-scale screen) due to the unstable voltage across the color filter substrate caused by electrical conduction. Moreover, different from the method using conductive adhesive, the metal micro-balls 11 are mixed in the sealant 12 at a ratio and thus are applied along with coating of the sealant. In this case, the individual adhesive coating process is not needed any more, and the yield for TFT LCDs is improved. Thus the conductive metal micro-balls are provided in the regions for assembling the color filter substrate and the TFT array substrate, establishing electrical connection between the color filter substrate and the TFT array substrate through via holes.

The metal micro-balls 11 may also appear in regions not for assembling, where connecting lines, such as data lines, gate lines, etc, are disposed for the display region. Some of the metal micro-balls even electrically contact with the common electrode of the color filter substrate, and such contact shortens the distance between the common electrode of the color filter substrate and the data lines (or the gate lines) on the array substrate and locally forms a capacitor of small capacity, which is sensitive to electrostatic, by one or more metal micro-balls, the insulating protective layer, and data lines or gate lines. In subsequent process, the electrostatic accumulates and releases through the capacitor and possibly results in the conduction between the conductive lines and the common electrode on the color filter substrate. Such ESD causes irreparable damages such as line breakage, short-circuit, etc. FIG. 3 exemplarily shows the site liable to suffer from ESD damage.

SUMMARY

According to an embodiments of the invention, there is provided a thin film transistor liquid crystal display (TFT LCD), comprising a color filter substrate and an array substrate disposed opposite to each other; wherein the array substrate comprises a base substrate, data lines and gate lines formed on the base substrate, and an insulating protective layers on the data lines or gate lines; the color filter substrate and the array substrate are assembled with each other in a peripheral portion with sealant mixed with metal micro-balls at a ratio, and a top conductive film is formed on the insulating protective layer above the data lines or gate lines below the sealant in the peripheral portion.

According to another embodiments of the invention, there is provided a method of manufacturing a thin film transistor liquid crystal display (TFT LCD), comprising forming, on a base substrate, gate lines, thin film transistors, data lines, and an insulating protective layer above the data lines and gate lines; depositing and patterning a transparent electrode layer on the insulating protective layer so as to form a pixel electrode and a top conductive film that is above the data lines or gate lines in a periphery region, where sealant mixed with micro-balls is coated for assembling, so as to obtain an array substrate; and assembling the array substrate with a color filter substrate using the sealant mixed with metal micro-balls in the periphery region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Exemplary embodiments of the present invention will be described hereinafter with reference to the accompanying drawings. It should be understood that in this description when a layer or an element is referred to as being "on" or "connected to" another layer or element, this layer or element can be directly on or directly connected to the other layer or element, or an intervening layer may also be present.

In the implementation of the invention, the photo mask for forming a pixel electrode is modified in a peripheral portion of a TFT array substrate, especially, in a top region above various metal connecting lines, such as data lines or gate lines, and after patterning a top conductive film of the same material as that of the pixel electrode is left in the top region and contacts metal micro-balls mixed in the sealant, so as to constitute a capacitor with the top conductive film, the data lines or gate lines, and an insulating protective layer above the data lines or gate lines. The capacitor has more capacity and can prevent the accumulation and release of electrostatic from occurring on isolated points, thus avoiding ESD breakdown.

Figure 1:
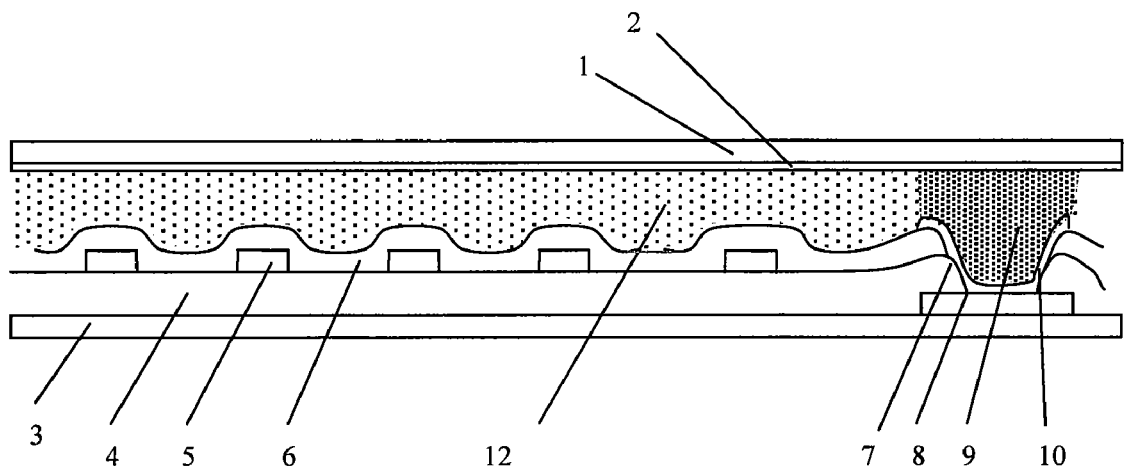
FIG. 1 is a sectional view illustrating a peripheral structure around a TFT LCD display region according to a conventional technique.
Figure 2:
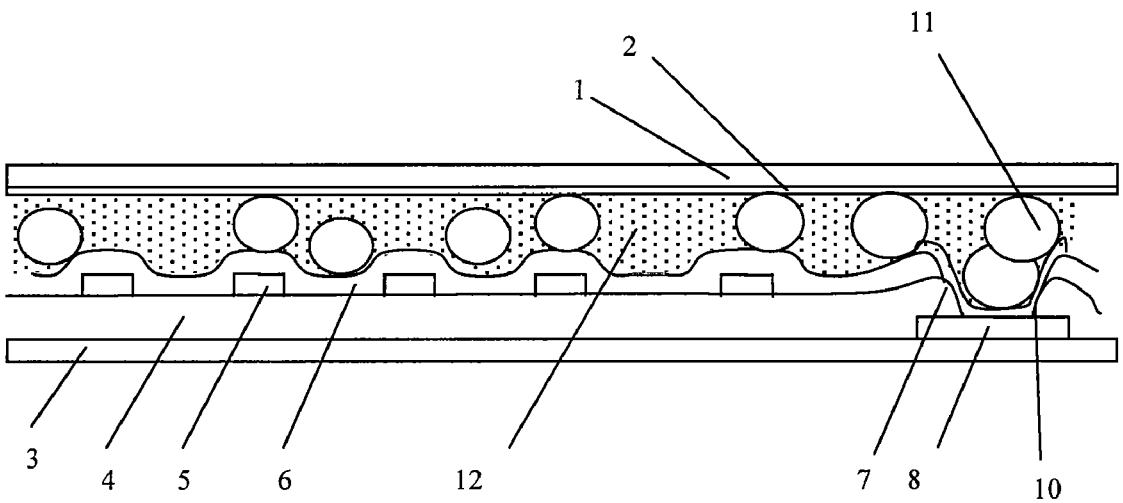
FIG. 2 is a sectional view illustrating another peripheral structure around a TFT LCD display region according to the conventional technique.
Figure 3:
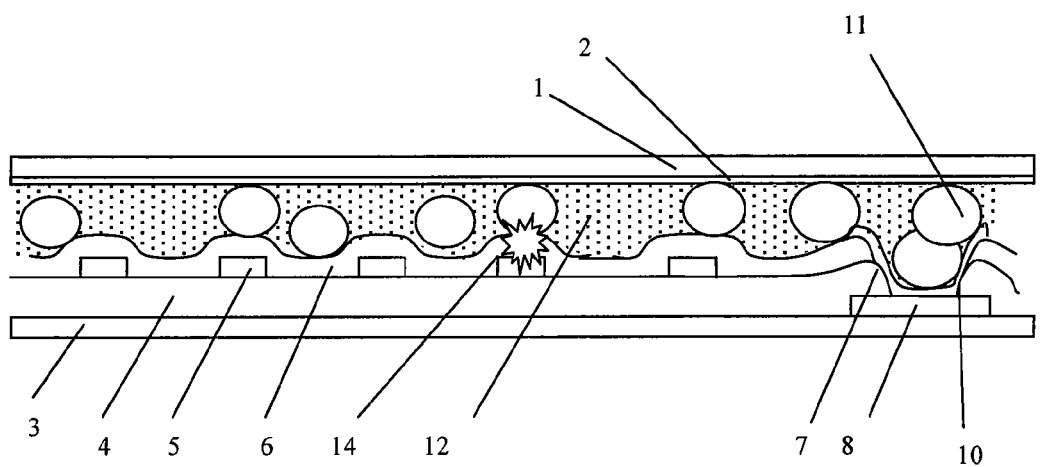
FIG. 3 is a schematic view illustrating ESD breakdown formed in the peripheral structure around the TFT LCD display region using metal micro-balls according to the conventional technique.
Figure 4:
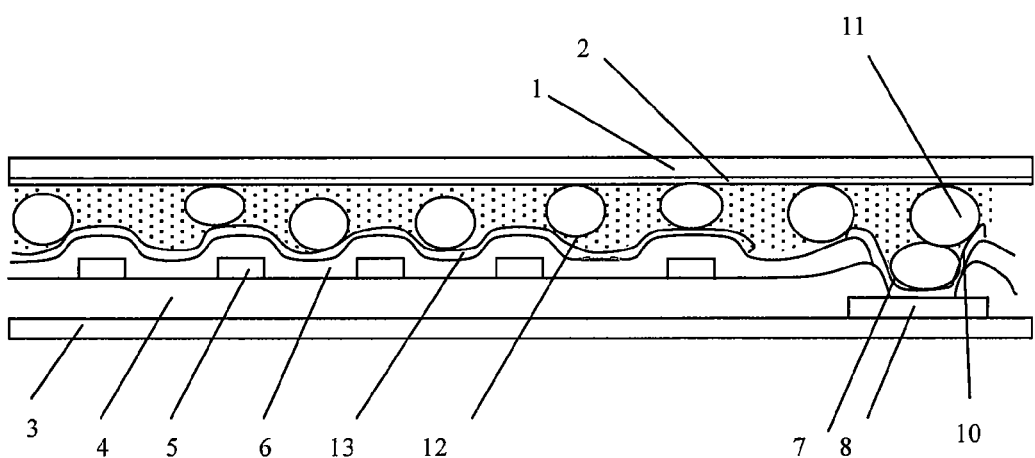
FIG. 4 is a sectional view of a peripheral structure around a TFT LCD display region according to an embodiment of the invention

FIG. 4 is a sectional view of a peripheral structure around a TFT LCD display region according to an embodiment of the invention. As shown in FIG. 4, the TFT LCD according to the embodiment of the invention comprises a color filter substrate and an array substrate disposed opposite to each other. The color filter substrate comprises a base substrate 1 and a common electrode 2 covering the base substrate 1. The array substrate comprises a base substrate 3, a common electrode 8 formed on the base substrate 3, a bottom metal insulating layer 4 formed on a bottom metal layer (comprising the common electrode 8, gate lines, etc (not shown)), data lines 5 formed above the bottom metal insulating layer 4, and an insulating protective layer 6 covering the data lines 5. A via hole 7 is formed in the insulating layers (comprising the bottom metal insulating layer and the insulating protective layer) above the common electrode 8, and a via hole conductive film 10 is formed within the via hole 7 (for example formed of the same material for a pixel electrode (not shown)). The color filter substrate and the array substrate are assembled with each other with sealant 12 in a peripheral portion around the display region. The sealant 12 is mixed with metal micro-balls 11 therein at a ratio that is enough to establish the electrical connection between the substrates. The TFT array substrate electrically connects with the color filter substrate 2 through the metal micro-balls 11 as well as the via hole conductive film 10 above the common electrode 8.

In addition, a top conductive film 13 is formed in the top region above the data lines or gate lines in the peripheral portion of the TFT array substrate, and the top conductive film 13 establishes the connection among metal micro-balls 11 in the peripheral portion and can prevent the accumulation and release of electrostatic at some isolated points, thus the ESD breakdown can be avoided effectively. The top conductive film 13 can further be formed along with the via hole conductive film 10 in via hole 7, the both films can be made of the same material for the pixel electrode of the TFT LCD.

The TFT LCD according to the embodiment of the invention may be manufactured with the following exemplary method. In the method, an array substrate is prepared and then assembled with a color filter substrate.

First, for example, with a magnetron sputtering method, a gate metal thin film having a thickness ranging from about 1000 Å to about 7000 Å can be formed on a base substrate 3 for a TFT array substrate. The base substrate 3 comprises, for example, a glass substrate or a plastic substrate. The material for the gate metal thin film may comprise such metals as molybdenum, aluminum, Al—Ni alloy, Mo—W alloy, chrome or copper. Then, the gate metal thin film is patterned with photolithography and etching so as to form a bottom metal layer comprising the common electrode 8, gate lines, and gate electrodes for thin film transistors (TFTs).

Secondly, for example, with a chemical vapor deposition method, a bottom metal insulating layer 4 having a thickness ranging from about 1000 Å to about 6000 Å and an amorphous silicon thin film having a thickness ranging from about 1000 Å to about 6000 Å can be sequentially deposited on the bottom metal layer. The material for the bottom metal insulating layer may comprise oxide, nitride or oxynitride, and the silicon nitride is preferred. The amorphous silicon layer is patterned with photolithography and etching so as to form an active layer for forming thin film transistors. This bottom metal insulating layer 4 also function as gate insulating layer on the gate electrodes for TFTs.

Thirdly, with the method similar to that for the gate metal thin film, a source-drain metal thin film similar to the gate metal thin film and having a thickness ranging from about 1000 Å to about 7000 Å is deposited on the resultant substrate 3, and the source-drain metal thin film may comprise molybdenum, aluminum, Al—Ni alloy, Mo—W alloy, chrome or copper. Also, the source-drain metal thin film is patterned with photolithography and etching so as to form the source and drain electrodes for thin film transistors and data lines.

Fourthly, with the method similar to that for the bottom metal insulating layer 4, an insulating protective film having a thickness ranging from about 1000 Å to about 6000 Å is deposited on the resultant array substrate. The insulating protective film may comprise oxide, nitride or oxynitride, and the silicon nitride is preferred. Also, the insulating protective film is patterned with photolithography and etching so as to form a via hole 7 therein, and the via hole 7 further penetrates the bottom metal insulating layer 4 and reaches the common electrode 8.

Finally, for example, a transparent electrode layer (pixel electrode layer) is deposited using a magnetron sputtering method on the resultant array substrate. The commonly used material for the transparent electrode layer comprises indium tin oxide (ITO), indium zinc oxide (IZO), tin oxide (SnOx), etc, having a thickness ranging from about 100 Å to about 1000 Å. This transparent electrode layer is patterned with photolithography and etching so as to form a pixel electrode (not shown), a via hole top conductive film 10 within the via hole 7, and a top conductive film 13 above the data lines or gate lines in the peripheral portion of the TFT array substrate. The top conductive film 13 is separated from the pixel electrode.

After forming the array substrate as described above, the array substrate is assembled to form a panel with a color filter substrate by using sealant mixed with micro-balls. The sealant is coated in the peripheral portion and the top conductive film 13 is below the coated sealant in the peripheral portion.

During the subsequent process for assembling the TFT array substrate and the color filter substrate, the sealant mixed with metal micro-balls at a ratio is coated in the peripheral region, and the top conductive film 13 contacts with a portion of the metal micro-balls in the sealant and forms interconnection among the micro-balls; therefore, a capacitor is constituted with the top conductive film, the insulating protective film, and the data lines or gate lines, different from the conventional structure with metal micro-balls only. Such capacitor in the embodiment has increased capacitance and can prevent the accumulation and release of electrostatic on isolated points, thus ESD breakdown can be avoided effectively.

The method above described for forming an array substrate is a five photolithography process, and the array substrate also can be manufactured with a four photolithography process or other process. In these processes for manufacturing the array substrate, the final step is to form the pixel electrode.

Figure 5:
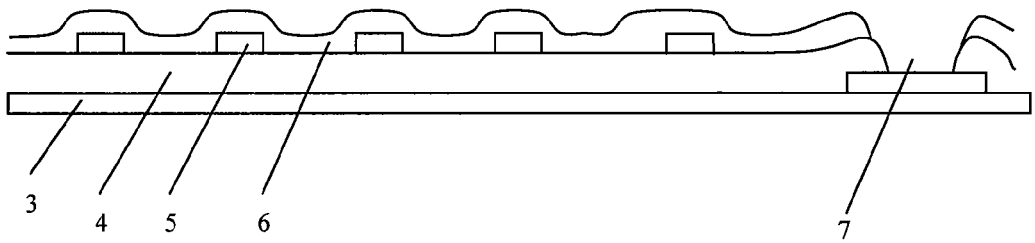
FIG. 5 is a sectional view of the peripheral structure around a TFT LCD display region after patterning a insulating protective layer according to the embodiment.
Figure 6:
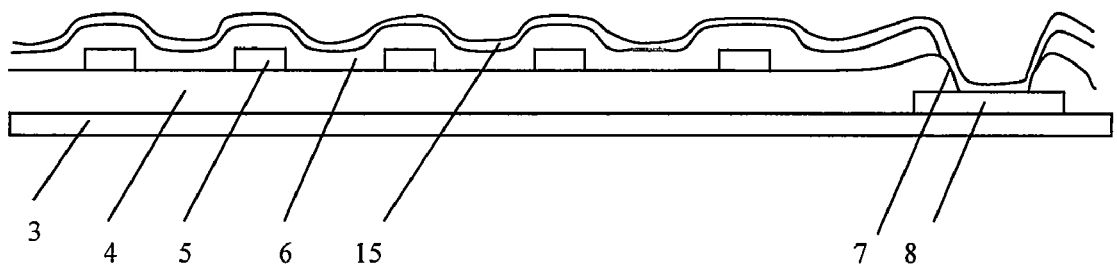
FIG. 6 is a sectional view of the peripheral structure around a TFT LCD display region after depositing a pixel electrode layer according to the embodiment.
Figure 7:
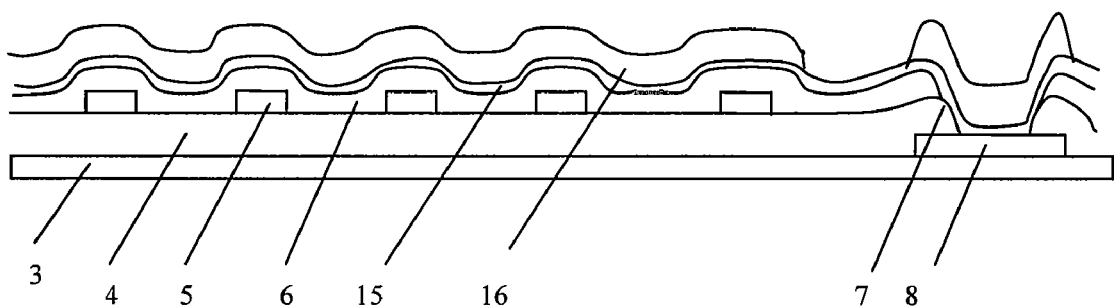
FIG. 7 is a sectional view of the peripheral structure around a TFT LCD display region after forming a photoresist pattern on the pixel electrode layer according to the embodiment.
Figure 8:
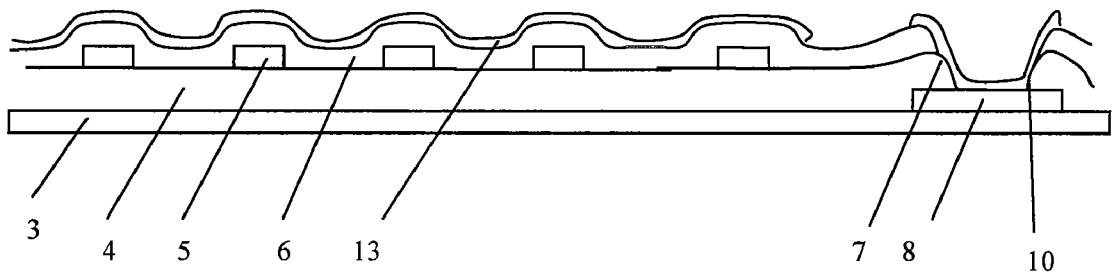
FIG. 8 is a sectional view of the peripheral structure around a TFT LCD display region after etching the pixel electrode layer and removing the photoresist pattern according to the embodiment.

FIG. 5 is a sectional view of the peripheral structure around the TFT LCD display region after patterning the insulating protective layer 6. FIG. 6 is a sectional view of the peripheral structure around the TFT LCD display region after depositing the pixel electrode layer 15. FIG. 7 is a sectional view of the peripheral structure around the TFT LCD display region with a photoresist pattern on the pixel electrode layer 15 after exposing and developing of photoresist. As shown in FIG. 7, in addition to the portion of the photoresist left on via hole 7, a portion of the photoresist also remains on the data lines or gate lines in the peripheral portion for applying sealant around the display region. With the photoresist pattern as etch mask, the pixel electrode layer is etched to form the pixel electrode (not shown), the via hole top conductive film 10 within the via hole 7, and the top conductive film 13 above the data lines or gate lines in the peripheral portion of the TFT array substrate, as shown in FIG. 8.

Compared with the peripheral structure around a conventional TFT LCD which tends to suffer from ESD breakdown, the embodiment of the invention forms, in the peripheral portion (the top layer region above data lines or gate lines) of a TFT array substrate, a top conductive film of the same material as that of a pixel electrode, so that a capacitor with increased capacitance is constituted with the top conductive film, data lines or gate lines, and an insulating protective layer over the data lines or gate lines, and can prevent the accumulation and release of electrostatic on isolated points. In this way, the ESD breakdown can be avoided effectively.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A thin film transistor liquid crystal display (TFT LCD), comprising:
    a color filter substrate and an array substrate disposed opposite to each other;
    wherein the array substrate comprises a base substrate, data lines and gate lines formed on the base substrate, and an insulating protective layers on the data lines or gate lines;
    the color filter substrate and the array substrate are assembled with each other in a peripheral portion with sealant mixed with metal micro-balls at a ratio, a top conductive film is formed on the insulating protective layer above the data lines or gate lines below the sealant in the peripheral portion, and the top conductive film, the insulating protective layer, and the data lines or gate lines constitute a capacitor together.

2. The TFT LCD of claim 1, wherein the top conductive film is formed of the same material as that for a pixel electrode on the insulating protective film.

3. The TFT LCD of claim 2, wherein the top conductive film and the pixel electrode on the insulating protective film are isolated from each other.

4. The TFT LCD of claim 1, wherein the data lines or gate lines are formed of a material selected from the group consisting of molybdenum, aluminum, Al—Ni alloy, Mo—W alloy, chrome, and copper.

5. The TFT LCD of claim 1, wherein the insulating protective layer is formed of a material selected from the group consisting of oxide, nitride, and oxynitride.

6. A method of manufacturing a thin film transistor liquid crystal display (TFT LCD), comprising:
    forming, on a base substrate, gate lines, thin film transistors, data lines, and an insulating protective layer above the data lines and gate lines;
    depositing and patterning a transparent electrode layer on the insulating protective layer so as to form a pixel electrode and a top conductive film that is above the data lines or gate lines in a periphery region, where sealant mixed with micro-balls is coated for assembling, so as to obtain an array substrate; and
    assembling the array substrate with a color filter substrate using the sealant mixed with metal micro-balls in the periphery region.

7. The method of claim 6, wherein the data lines or gate lines are formed of a material selected from the group consisting of molybdenum, aluminum, Al—Ni alloy, Mo—W alloy, chrome, and copper.

8. The method of claim 6, wherein the insulating protective layer is formed of a material selected from the group consisting of oxide, nitride, and oxynitride.

* * * * *